Sept. 6, 1932.  W. N. BOOTH  1,876,394
VEHICLE WHEEL
Filed April 27, 1931  2 Sheets-Sheet 2
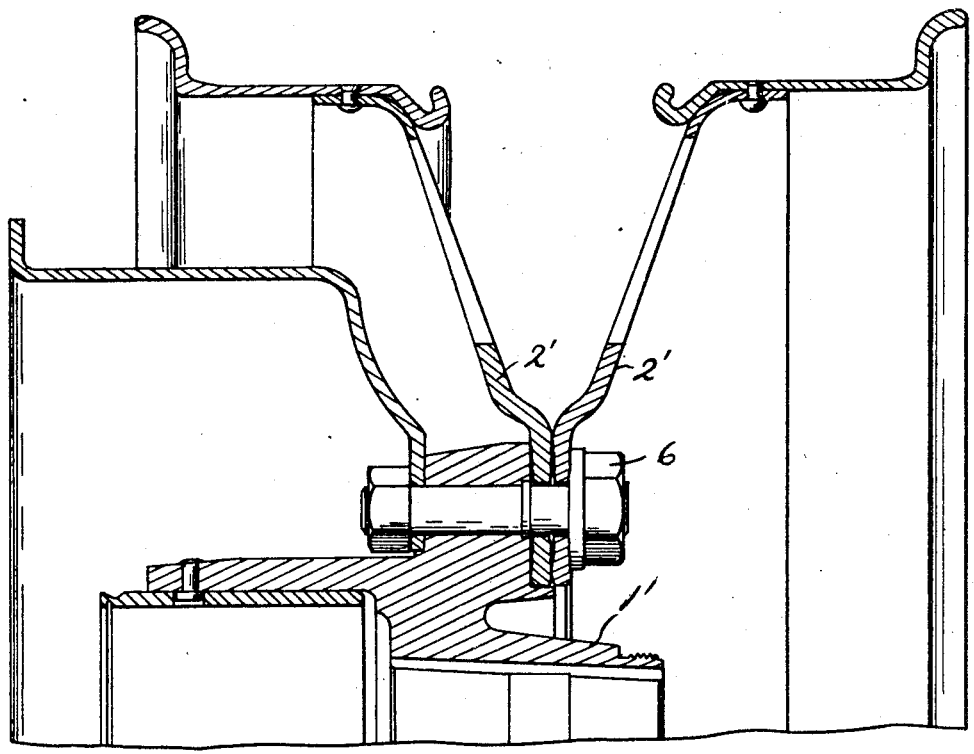
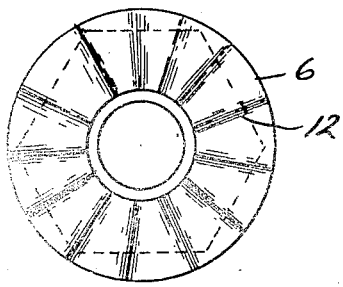
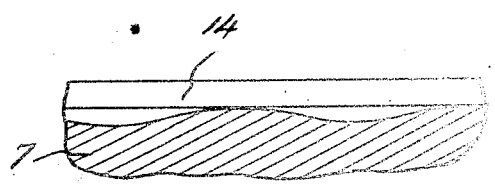
INVENTOR
William N. Booth
BY
ATTORNEYS Patented Sept. 6, 1932

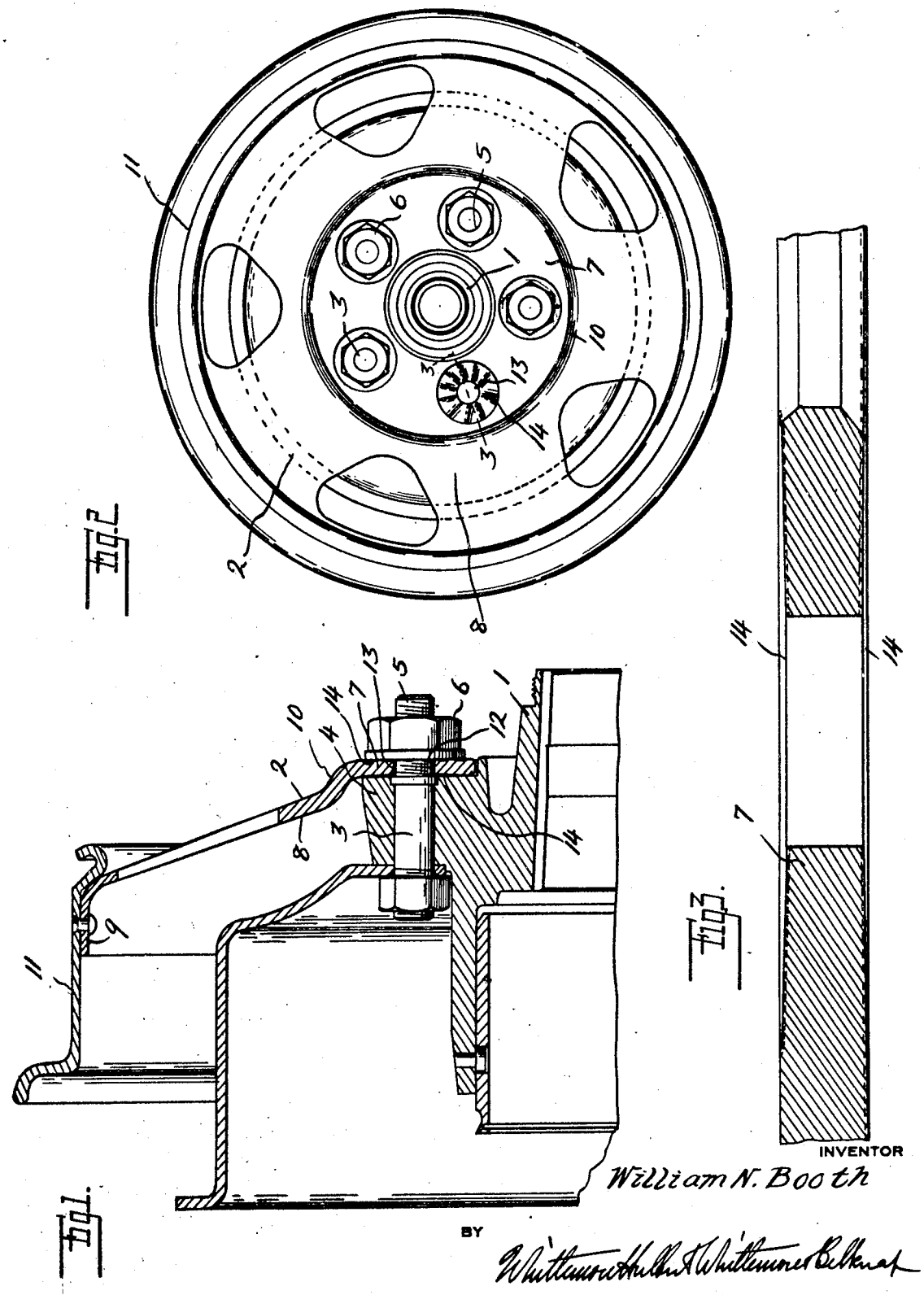

1,876,394

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

VEHICLE WHEEL

Application filed April 27, 1931. Serial No. 533,328.

The invention relates to vehicle wheels and refers more particularly to wheels adapted for use with motor vehicles and of that type having a wheel body demountable from a hub member. One of the objects of the invention is to so construct the wheel that the wheel body may be reversibly mounted upon the hub member and in either position resiliently engages the threaded securing means to hold the latter from accidental disengagement. Another object is to so construct the wheel that fracture of the wheel body in the vicinity of the securing means is greatly minimized, if not entirely eliminated. A further object is to so construct the wheel that it is of relatively light weight and has relatively great strength.

These and other objects of the invention will become apparent from the following description, taken in connection with the accompanying drawings, in which Figure 1 is a radial section through a vehicle wheel, showing an embodiment of my invention;

Figure 2 is a front elevation thereof with one of the securing nuts removed;

Figure 3 is an enlarged cross section through the wheel body on the line 3—3 of Figure 2;

Figure 4 is an enlarged view showing the deflated surface of the portion illustrated in Figure 3;

Figure 5 is a rear elevation of a nut;

Figure 6 is a view similar to Figure 1, showing another embodiment of the invention.

The wheel comprises the hub 1 which, as shown in the present instance, is a rear wheel hub and the wheel body 2 which is a sheet steel wheel disk. The annular series of bolts 3 extending substantially parallel to the axis of the wheel hub are fixedly secured to the radial flange 4 of this hub and have the threaded portions 5 extending forwardly of the radial flange for engagement by the nuts 6 for securing the wheel body to the wheel hub.

The wheel body may be used singly, as shown particularly in Figure 1, or may be used with another like wheel body to form a dual wheel, as shown in Figure 6. Furthermore, the wheel body is so constructed that it may be reversibly mounted upon the wheel hub and is adapted in either position to cooperate with the securing nuts to hold these nuts from accidental disengagement. The disk forming the wheel body has the central or hub portion 7, the outwardly tapering conical portion 8 terminating in the transverse flange 9 and the reinforcing lateral annular shoulder portion 10 connecting the hub and tapering portions. The flange 9 has fixedly secured thereto the tire carrying rim 11.

Each of the securing nuts 6 has the relatively flat radially serrated rear contact face 12 with the serrations extending radially from the axis. The disk forming the wheel body has its hub portion 7 provided with the annular series of holes 13 for receiving the securing bolts 3 and has at its opposite sides and encircling each of these holes the depressed serrated contact faces 14, each of which has its serrations extending radially from the axis of the hole and corresponding to the serrated contact faces 12 of the securing nuts. The depressed serrated contact faces are, however, of greater diameter than the serrated contact faces of the nuts to provide the required movement or springing of the metal, which is between the opposite contact faces and resilient, to permit the serrations upon the nuts to move over the serrations of the disk during the final portion of the screwing up of the nuts to clamp the disk to the wheel hub or during the initial untightening of the nuts preparatory to removing the disk from the hub. The depressed serrated contact faces in the disk are formed by a stamping operation and preferably those at both sides of the disk are simultaneously formed; and by reason of the stamping these serrated contact faces in the disk are hardened.

It will be noted from Figure 1 that the depressed serrated contact faces 14 at the front side of the disk are engaged by the corresponding serrated rear contact faces of the securing nuts 6 and that the depressed serrated contact faces at the rear side of the disk provide the necessary clearance for the springing movement of those parts of the hub portion of the disk between the securing nuts and the radial hub flange 4 to provide for the final tightening up of the securing nuts or the initial loosening thereof. From Figure 6 it will be seen that where the two disks are used to form the dual wheel, the front disk 2' is reversibly mounted upon the wheel hub 1', both of these disks corresponding in construction to the disk 2, as does also the hub 1' to the hub 1. It will be further seen from this figure that the depressed serrated contact faces in the hub portion of the front disk provide for the required springing movement of those parts of the hub portion clamped by the securing nuts to secure the final tightening up or the initial loosening of the securing nuts.

What I claim as my invention is:

1. A vehicle wheel, comprising a hub member, a series of threaded members upon and extending substantially parallel to the axis of said hub member, a nut for each of said threaded members having a serrated contact face, and a wheel body having a sheet metal member adapted to be secured to said hub member by said threaded members and nuts, said sheet metal member having holes therethrough for receiving said threaded members and having serrated contact faces in its opposite sides and encircling said holes for engaging said contact faces of said nuts.

2. A vehicle wheel, comprising a hub member, a series of threaded members upon and extending substantially parallel to the axis of said hub member, a nut for each of said threaded members having a serrated contact face, and a wheel body having a sheet metal member adapted to be secured to said hub member by said threaded members and nuts, said sheet metal member having holes therethrough for receiving said threaded members and having depressed serrated contact faces in its opposite sides and encircling said holes for engaging said contact faces of said nuts, said depressed contact faces being of greater area than said contact faces of said nuts.

3. A vehicle wheel, comprising a hub member, an annular series of bolts extending substantially parallel to the axis of said hub member, a nut for each of said bolts having a serrated contact face and a sheet metal wheel disk adapted to be secured to said hub member by said bolts and nuts, said disk having holes therethrough for receiving said bolts and also having depressed serrated contact faces in its opposite sides and encircling said holes of greater diameter than said contact faces of said nuts for engaging the same.

4. A vehicle wheel, comprising a hub member, an annular series of bolts upon and extending substantially parallel to the axis of said hub member, a nut for each of said bolts and having a relatively flat serrated contact face with the serrations extending substantially radially from the axis of said nut, and a wheel body having a sheet metal member adapted to be secured to said hub member by said bolts and nuts, said sheet metal member having holes therethrough for receiving said bolts and also having depressed serrated contact faces in its opposite sides and encircling said holes and of greater diameter than said contact faces of said nuts, said contact faces of said sheet metal member extending radially from the axes of said holes and being resiliently carried and arranged for engagement by said contact faces of said nuts.

5. A vehicle wheel, comprising a hub member, a series of threaded members upon and extending substantially parallel to the axis of said hub member, a nut for each of said threaded members having a serrated contact face, and a wheel body adapted to be secured to said hub member by said threaded members and nuts, said wheel body having a resilient portion with holes therethrough for receiving said bolts and with corresponding portions on opposite sides and encircling said holes for resilient alternative engagement with said serrated contact faces of said nuts.

In testimony whereof I affix my signature.

WILLIAM N. BOOTH.